United States Patent Office 3,149,789
Patented Sept. 22, 1964

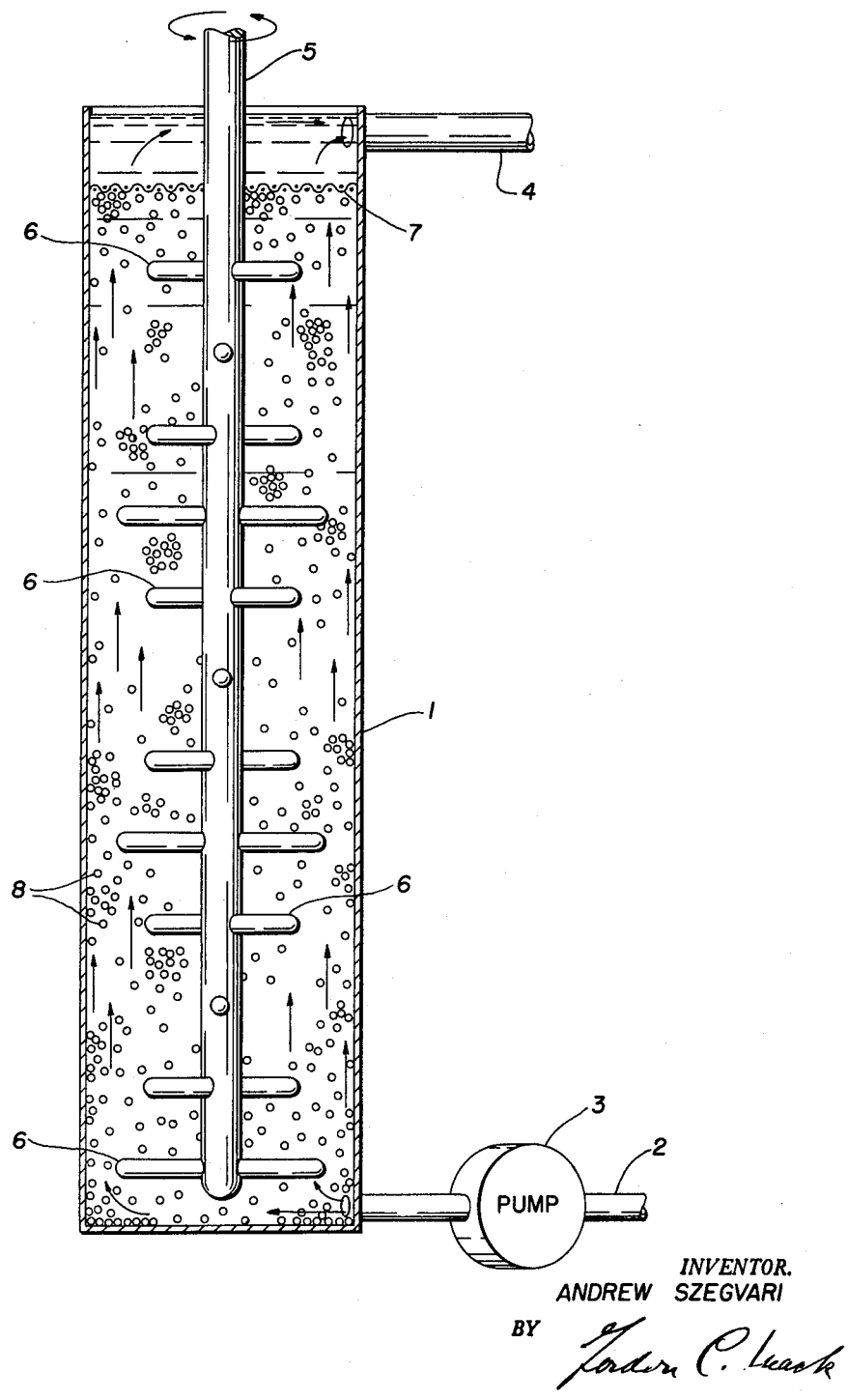

3,149,789
CONTINUOUS PROCESS OF GRINDING
PARTICULATE MATERIAL
Andrew Szegvari, 201 Castle Blvd., Akron 13, Ohio
Filed Oct. 28, 1960, Ser. No. 65,796
2 Claims. (Cl. 241—27)

This invention relates to the processing, and preferably the grinding of materials while suspended in water or other liquid. The operation is carried out in a substantially cylindrical vertical vessel. The operation is continuous with the addition of the suspension or components of the suspension adjacent one end of the vessel, preferably the bottom of the vessel, on a substantially continuous basis, and removal of the suspension of the product on a substantially continuous basis adjacent the other end of the vessel. The operation is so conducted as to obtain fast processing by agitated grinding elements.

Although the invention will be described more particularly as applied to the grinding of materials, the operation also is adapted to the carrying out of chemical reactions, as in the polymerization of monomers to produce elastomers or other resins particularly where the time of the reaction is a basic parameter determining the length of the resulting polymer chain; the resulting polymer product being composed of chains of more nearly uniform length than is obtainable by the usual processes of polymerization.

With respect to the grinding of materials, the process is applicable to both coarse grinding and fine grinding. It is applicable to the grinding of very hard materials such as iron oxide, etc., and to relatively frangible materials such as coal, etc. The particle size of the solid starting material may vary from particles measuring as little as 325 mesh or even less, to particles measuring as much as ⅛ inch or ¼ inch, or possibly more in the largest diameter. The particle size of the particles in the final suspension may be as small as ½ micron or less, or as large as 5 microns or even somewhat larger. The particle sizes of the solid in the starting material and the final product are not critical, nor is the solid or the liquid employed critical; neither is the viscosity of the liquid critical.

The equipment described here is based on a new development originating with my Patent No. 2,764,359, which is used primarily for "batch processing." For the use of continuous processing, however, new processing principles have been discovered which render such equipment greatly more effective. These principles apply to any system which is controlled by the statistical probability of kinetically independent balls (or similar bodies) in an agitated condition.

This invention applies to a multi-dimensional statistical realm, the dimensions of which are the direction of the progress in space and time and the cross section of the process in space and time. We distinguish two main directions, namely, direction along the time-space path leading from the beginning to the end state, and direction laterally to it (which direction goes through the cross section of the processing realm). The principle which has been evolved to explain the surprising results set forth herein can be stated as follows: The most effective progress leading to the end point is such when the individual space elements of the realm continue toward the end point without changing position or being intermixed with neighboring lateral space elements.

This is based on the fact that the statistical probability of the function controlling the action within the realm is increasing more steeply than linear with a concentration of any specific unit to be acted upon. For instance, if we wish to grind some material and we consider the concentration C of all the material present in its original size, then the progress of the disappearance of this original size is as follows:

$$P = A_1 C + (A_2 C)^2 + (A_3 C)^3 + (A_4 C)^4$$

P is the statistical probability for the depletion of the original size of the particles, and $A_1$, $A_2$, $A_3$ and $A_4$ . . . are each small positive coefficients. This is obviously a function which is much more steep than linear since its first derivative is larger than one and all subsequent derivatives are also larger than one. This can be proved mathematically.

In this way we can explain why, given continuous grinding in a vessel containing agitating elements as herein described, in the most efficient operation all portions of the original feed should progress (while being ground) towards the exit without being mixed with other portions of the surrounding medium. Thus, the accumulation of ground material present in each portion increases progressively as that portion passes through the vessel without addition or subtraction of ground material from adjacent portions. This is referred to herein as statistical accumulation. The reason that the adjective "statistical" is employed is that the elementary step leading to the accumulation of the finely ground end product, namely the contact between two grinding elements, is controlled by the laws of probability.

Once the principle has been stated, it can be seen why these measures are so surprisingly effective, in many cases the increases of the effectiveness being in the ratio of 1:10 and in some cases as high as 1:50.

The equipment used is an improvement over that described in my U.S. Patent 2,764,359. It contains many substantially spherical grinding elements all of the same diameter. They can be very small as long as the grinding elements are still mechanically effective, and can be separated from the finished product; and they can be larger as long as they provide the substantially optimum statistical probability of successful collisions with other elements during the grinding operation. They may be composed of steel, tungsten carbide or ceramics, or they may be pebbles formed naturally. In some cases, they are preferably of relatively high specific gravity so as to produce grinding impact when they contact one another during the grinding operation; in other cases a lighter element is preferred in particular when a floating condition of the grinding elements is required; and they must be resistant to any chemical present.

The agitating equipment includes a central vertical agitator shaft with horizontal arms preferably straight, distributed effectively throughout the submerged length of the vertical shaft, and each extending close to the wall of the vessel with a space of three grinding-element diameters between the end of each and the wall. The arms are arranged at an angle to one another, preferably with each arm at an angle of about 45 degrees behind the arm below it. The angle is not critical, and the arms may be arranged at 30 degrees or other suitable angle to one another.

The vessel employed differs from the vessel disclosed in my U.S. Patent 2,764,359 in that all arms extend outwardly preferably the same distance to the wall of the vessel and they are distributed preferably evenly and continuously throughout the entire submerged length of the central agitator shaft. The grinding elements fill the vessel so that in the preferred operation the top horizontal arm of the agitator is entirely submerged in the grinding elements. A further essential difference is in the shape of the vessel. In a vessel such as disclosed in U.S. 2,764,359, there is internal circulation of the liquid down at the center of the vessel and up at the wall. This produces lateral currents. The entire process and equipment of the invention of this application are designed to eliminate entirely or substantially entirely all lateral flow within the vessel so that the flow is substantially only an axial flow, either up or down, in order to provide unidirectional flow as described above.

The height of the vessel is limited by the necessity of maintaining the grinding elements in an activated condition throughout the entire height of the vessel. This is facilitated by introducing the fresh liquid suspension (or its components) at the bottom of the vessel and removing the resultant product from the top of the vessel.

The vessel may be jacketed for temperature control, if desired. Any suitable means for separating the grinding elements from the suspension of the ground material may be provided. Although such separation is ordinarily effected as the suspension is removed from the vessel, the grinding elements may be removed from the vessel with the suspension and subsequently separated from it.

With equipment of this type there is substantially no lateral flow of the liquid. The agitator produces a general spiral flow without lateral flow, and the main flow is vertical with little or no lateral flow. This is desirable for the reasons explained.

The agitator is rotated at a speed necessary to impart to the grinding elements sufficient kinetic energy to maintain them out of static contact with one another. Excessive speed causes centrifugal impact with the walls of the vessel, which will cause undesired lateral flow.

Although the invention is described more particularly in connection with rotation of an agitator within a vessel, it is conceivable that the agitator may be stationary and the vessel rotated about it, or movement may be imparted to both the vessel and the agitator.

The invention will be further described in connection with the accompanying drawing, which is a view in section through a vessel with an agitator and agitating elements submerged in a suspension under treatment.

The vessel 1 illustrates a preferred type of equipment in which the diameter is 10 inches and the height is 40 inches. The inlet 2 is 1 inch and any suitable pump 3 is employed. The outlet 4 is 1½ inches in diameter. The agitator 5 is rotated by any suitable means such as an electric motor (not shown). The arms 6 each extend outwardly about 3 inches from the shaft 5 which is 1½ inches in diameter. They may be somewhat longer. At the top of the vessel is the sieve 7 which separates the overflowing finished suspension from the balls 8 which may be of a suitable diameter such as indicated generally in the following table.

OPTIMUM SIZE RANGE OF GRINDING ELEMENTS

| Material | Small | to Large |
| --- | --- | --- |
| Flint | ¼" | ⅝" |
| Steel or other metals | 0.010" | ⅝" |
| Ceramics | ⅛" | ⅜" |

Selection is made according to the processing to be performed. For instance, to grind coarse coal to 200 mesh, one will preferably use ⅝" size steel balls; for processing of 325-mesh titanium dioxide slurry to 8 N.S. fineness, one will preferably use ⅛" size ceramic balls. The foregoing is illustrative and the invention is not limited thereto since grinding elements of other compositions within the general size range indicated may be employed.

Different types of inlets and outlets may be employed and the screen or sieve 7 may be arranged suitably. For instance, it may extend vertically with an overflow over all of the top edges of the vessel.

The ratio of the height to the diameter of the vessel which is 4:1 in the accompanying drawing, may be varied over a certain range. The diameter may vary, according to the rate of production in relation to the fineness to be obtained. The ratio of the height to the diameter can also vary, being such as to repress the tendency for internal circulation of the liquid in a downward direction at the center of the vessel and up at the walls; such circulation produces lateral flow which is undesirable. Vessels with a height as great as five or six or more times the diameter can be employed, and the height may be as little as three times the diameter or even less.

The following examples illustrate operations carried out on materials of widely different composition:

*Example I*

TITANIUM WHITE HOUSE PAINT BASE

The paint base was composed of the following materials:

| | Parts by weight |
| --- | --- |
| Titanium dioxide | 23 |
| Whiting | 21 |
| Calcium silicate and magnesium silicate | 7.5 |
| Varnish (35 to 60% solids content) | 36.5 |
| Mineral spirits and driers | 12 |

A composition of the foregoing formula was prepared in apparatus such as illustrated in FIGURE 1. Although the volume of the empty vessel measuring 10 inches in diameter and 40 inches high would be 13.6 gallons, the residence (meaning the total volume minus the volume of the agitator and agitating elements) was substantially 4½ gallons. The agitator was rotated at about 180 r.p.m. and the foregoing formula was fed through the apparatus so that the dwell within the apparatus was about 6 minutes. In this time the particles were ground from a zero reading to 7½ N.S. fineness. Three-sixteenth inch porcelain balls were used.

In a convention ball mill using pebbles, 16 hours would be required to obtain the same result. In standard equipment such as disclosed in my Patent No. 2,764,359 (known commercially as No. 1–S Pilot-size Attritor) 40 minutes would be required to obtain the same result.

*Example II*

CARBON BLACK ALKYD BASE

The following formula was employed:

| | Parts by weight |
| --- | --- |
| Carbon black | 28 |
| Alkyd resin [1] | 14 |
| Xylene | 58 |

[1] Based on non-volatile (or N.V.) content.

This material was similarly processed to 7½ N.S. fineness by feeding the material to the bottom of the vessel described in Example I, at such a rate that the dwell time was 4 minutes and 45 seconds, using steel balls 3/16 inch in diameter. The agitator was turned at 180 r.p.m. With a conventional ball mill, using steel balls, 16 hours would be required, and for the same size Attritor as mentioned in Example I, using 3/16 inch steel balls, 2 hours would be required.

*Example III*

CHROME GREEN BASE IN ALKYD

The following formula was employed:

| | Parts by weight |
| --- | --- |
| Chrome green pigment | 60 |
| Alkyd resin | 10 |
| Xylene (N.V.) | 30 |

The material was processed in the same manner as described in connection with Examples I and II, except that it was ground to No. 6 N.S. fineness.

Using 3/16 inch steel balls in the equipment described in Example I, a dwell time of 20 minutes in the vessel was required. The agitator was rotated at 180 r.p.m. Eighty hours would be required to produce the same results in a conventional ball mill, and 16 hours in standard commercial equipment of the type shown in U.S. 2,764,359.

In each of the foregoing examples the materials were reduced from zero N.S. reading to the readings indicated. The pigments were of quite different composition. Other materials of very different properties may similarly be ground in other liquids, and the ground materials may be separated from the liquids before use. Thus, the process is applicable to the production of paints, varnishes and finely ground materials to produce suspensions of other types and also to produce ground materials per se.

The invention is covered in the claims which follow.

What I claim is:

1. The improvement in the process of grinding particulate material in a liquid in the presence of a multiplicity of spherical grinding elements of substantially the same size kinetically activated in a random fashion out of static contact with one another and into repeated contact with one another in an upright cylindrical zone, which improvement comprises adding liquid and particulate material to the zone adjacent one end thereof and removing liquid and ground particulate material from adjacent the other end thereof while kinetically agitating the grinding elements as aforesaid throughout substantially the whole of the liquid in the zone, while maintaining substantially constant unidirectional flow of the liquid and particulate material throughout the zone.

2. The process of claim 1 in which the liquid and particulate material are added adjacent the bottom of the zone and removed adjacent the top of the zone, and the unidirectional flow is upward.

References Cited in the file of this patent

UNITED STATES PATENTS

| | | |
|---|---|---|
| 1,956,293 | Klein et al. | Apr. 24, 1934 |
| 2,764,359 | Szegvari | Sept. 25, 1956 |
| 2,779,752 | Vining | Jan. 29, 1957 |
| 2,855,156 | Hochberg et al. | Oct. 7, 1958 |

UNITED STATES PATENT OFFICE
CERTIFICATE OF CORRECTION

Patent No. 3,149,789                      September 22, 1964

Andrew Szegvari

It is hereby certified that error appears in the above numbered patent requiring correction and that the said Letters Patent should read as corrected below.

Column 2, lines 3 and 4, after the equation insert a series of dots; line 61, for "toward the same distance to" read -- to the same distance toward --.

Signed and sealed this 6th day of April 1965.

(SEAL)
Attest:

ERNEST W. SWIDER                      EDWARD J. BRENNER
Attesting Officer                      Commissioner of Patents